United States Patent [19]

Snare et al.

[11] Patent Number: 4,999,062
[45] Date of Patent: Mar. 12, 1991

[54] EMULSION EXPLOSIVE COMPOSITION CONTAINING A CONDENSATION PRODUCT

[75] Inventors: Margaret J. Snare, Thornbury; David Yates, East Brunswick; Ross Sanders, Essendon, all of Australia

[73] Assignee: ICI Australia Operations Proprietary Limited, Melbourne, Australia

[21] Appl. No.: 313,846

[22] Filed: Feb. 23, 1989

[30] Foreign Application Priority Data

Feb. 23, 1988 [AU] Australia ............................... PI 6919

[51] Int. Cl.$^5$ .............................................. C06G 45/00
[52] U.S. Cl. ......................................... 149/2; 149/46; 149/61; 149/76; 149/77; 149/83; 149/109.6
[58] Field of Search ................... 149/2, 109.6, 46, 61, 149/76, 77, 83

[56] References Cited

U.S. PATENT DOCUMENTS

| | | | |
|---|---|---|---|
| 4,708,753 | 11/1987 | Forsberg | 149/2 |
| 4,828,633 | 5/1989 | Forsberg | 149/2 |
| 4,840,687 | 6/1989 | Forsberg | 149/2 |
| 4,844,756 | 7/1989 | Forsberg | 149/2 |
| 4,863,534 | 9/1989 | Forsberg | 149/2 |
| 4,919,178 | 4/1990 | Riga et al. | 149/2 |
| 4,919,179 | 4/1990 | Chattopadbyay | 149/2 |

Primary Examiner—Stephen J. Lechert, Jr.
Attorney, Agent, or Firm—Cushman, Darby & Cushman

[57] ABSTRACT

An emulsion explosive composition comprising a discontinuous phase comprising an oxygen-releasing salt, a continuous water-immiscible organic phase and an emulsifier component comprising a condensation product of a primary amine and a poly[alk(en)yl]succinic acid or anhydride and wherein the condensation product comprises at least 70% by weight succinimide product.

24 Claims, No Drawings

EMULSION EXPLOSIVE COMPOSITION CONTAINING A CONDENSATION PRODUCT

This invention relates to an emulsion explosive composition.

Commercially-available emulsion explosives are commonly of the water-in-oil type wherein discrete droplets of an aqueous solution of an oxygen-supplying source are emulsified in a continuous organic fuel phase. Such water-in-oil emulsion explosive compositions have been described in, for example, U.S. Pat. Nos. 3,447,978, 3,674,578, 3,770,522, 4,104,092, 4,111,727, 4,149,916 and 4,149,917.

In some applications, the water content in the oxidizer phase may be reduced to very low levels, for example, less than 4%, or even completely eliminated. Such melt-in-oil emulsion explosives have been described in, for example, U.S. Pat. No. 4,248,644. Throughout this specification the term "emulsion explosive composition" embraces both water-in-oil or melt-in-oil types.

In these emulsion explosives compositions, surface tension-modifying emulsifiers are used to promote subdivision in the continuous phase. The emulsifiers also have a stabilizing effect on the emulsion, preventing breakdown by inhibiting coalescence and agglomeration of the droplets.

In addition, the droplets of oxidizer phase are inherently metastable and exhibit a tendency to crystallize. Crystal growth impairs the sensitivity to detonation of the emulsion explosive compositions and in severe cases the interlocking of crystals may produce a solid composition which is very difficult to prime. Such emulsion explosive compositions are prone to a progressive deterioration of explosive performance during storage and transportation of the explosives prior to use. Further, various additives such as solid ammonium nitrate and microballoons, which are commonly used in emulsion explosives, tend to act as nucleating agents and may lead to, or increase, crystal growth.

A variety of emulsifier types and blends are disclosed in the art. Australian Patent Application No. 40006/85 (Cooper and Baker) discloses emulsion explosive compositions in which the emulsifier is a conductivity modifier. Included among such emulsifiers are condensation products of poly[alk(en)yl]succinic anhydride with primary amines such as ethylene diamine, diethylene triamine, dimethylaminopropylamine and ethanolamine.

The condensation reaction of a primary amine and poly[alk(en)yl]succinic acid or anhydride may produce an amide and/or an imide condensation product. For example reaction of ethanolamine with poly[alk(en)yl]succinic anhydride may produce any of the products of formula Ia, Ib and II wherein A is poly[alk(en)yl]

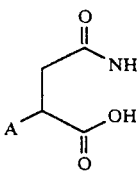

Ia

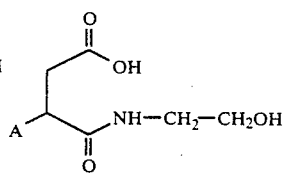

Ib

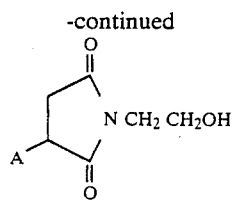

II

Typically, under standard reaction conditions, a mixture of amide and imide condensation products is formed. Amides form more rapidly and under less demanding conditions than do imides, thus the majority of the condensation product is amide. In fact, we have found high amide content to be desirable.

The present applicants have confirmed the excellent storage stability of emulsion compositions comprising such modifiers and have surprisingly now found that the stability of particular emulsion compositions is enhanced if the emulsifier comprises a condensation product of a primary amine and a poly[alk(en)yl]succinic acid or anhydride which comprises a high proportion of the succinimide product of formula II.

We therefore provide, in accordance with the invention, an emulsion explosive composition comprising a discontinuous phase comprising an oxygen-releasing salt, a continuous water-immiscible organic phase and an emulsifier component comprising a condensation product of a primary amine and a poly[alk(en)yl]succinic acid or anhydride and wherein the condensation product comprises at least 70% by weight of the succinimide product.

The term "primary amine" refers to compounds comprising at least one primary amine moiety.

In the poly[alk(en)yl]succinic acid and/or anhydride, preferably the poly[alk(en)yl] moiety incorporates a backbone sequence in the range of from 10 to 500 linked atoms which may be carbon atoms, or predominantly carbon atoms interrupted by heteroatoms such as oxygen or nitrogen.

A particularly preferred poly[alk(en)yl] is a saturated or unsaturated hydrocarbon chain which is a polymer of a mono-olefin, the polymer chain containing in the range of from 40 to 500 carbon atoms. Examples of such polyolefins include those derived from $C_2$ to $C_6$ olefin such as ethylene, propylene, 1-butene, isoprene and isobutene.

Particularly preferred poly[alk(en)yl] is poly(isobutylene) and preferably the molecular weight of the poly(alk(en)yl) portion is in the range of from 200 to 5000 and more preferably 400 to 2000.

Examples of primary amines include aliphatic amines, cycloaliphatic amines, aromatic amines and heteroaromatic amines which primary amines may optionally be substituted with one or more substituents.

Aliphatic amines may include $C_1$ to $C_{20}$ aliphatic amines wherein the aliphatic chain may be straight or branched. Preferably the aliphatic amine is a $C_1$ to $C_{20}$ alkyl amine. Specific examples of aliphatic amines include ethylamine, n-butylamine, allylamine, cocoa amine, tallow amine and lauryl amine.

Examples of preferred substituted aliphatic amines include: hydroxy ($C_1$ to $C_{10}$ alkyl) amines such as ethanolamine and 3-hydroxypropylamine; amino ($C_1$ to $C_{10}$ alkyl) amine such as aminoethylamine; ($C_1$ to $C_{10}$ alkyl)amines substituted with the group amino($C_1$ to $C_{10}$ alkyl)amino- such as diethylenetriamine; ($C_1$ to $C_{10}$ alkyl)amine substituted with the group N,N-di($C_1$ to $C_4$ alkyl) amino such as dimethylaminopropylamine; phenyl ($C_1$ to $C_{10}$ alkyl) amines such as benzylamine; and heterocyclic substituted ($C_1$ to $C_{10}$ alkyl) amines such as described in our copending Australian Patent Application Number PI 6920.

Examples of cycloaliphalic amines include cyclohexylamine and cyclopentylamine. Aromatic amines include aniline. Heteroaromatic amines include aminopyridines.

Preferred primary amines include ($C_1$ to $C_4$ alkyl)amines, in particular ethanolamine, and N—N, di($C_1$ to $C_4$ alkyl)amino($C_1$ to $C_4$ alkyl) amines, in particular dimethylaminipropylamine.

In emulsion explosive compositions of the present invention, it is an essential feature that at least 70% by weight of the condensation product be the succinimide compound. Such compositions, surprisingly, are generally more easily refined than corresponding compositions comprising a significant proportion amide condensation products. This allows compositions of the present invention to be prepared and refined to a given droplet size more rapidly and with the expenditure of less energy. Preferably at least 85% by weight of the condensation product will be the succinimide product. More preferably at least 90% by weight of the condensation product will be the succinimide product. Most preferably substantially all of the condensation product is the succinimide product.

Suitable oxygen-releasing salts for use in the composition of the invention include the alkali and alkaline earth metal nitrates, chlorates and perchlorates, ammonium nitrate, ammonium chlorates, ammonium perchlorate and mixtures thereof. The preferred oxygen-releasing salts include ammonium nitrate, sodium nitrate and calcium nitrate. More preferably, the oxygen-releasing salt comprises ammonium nitrate or a mixture of ammonium nitrate and sodium or calcium nitrates.

Typically, the oxygen-releasing salt component of the compositions of the present invention comprises from 45 to 95% and preferably from 60 to 90% by weight of the total composition.

In compositions wherein the oxygen-releasing salt comprises a mixture of ammonium nitrate and sodium nitrate, the preferred composition range for such a blend is from 5 to 80 parts of sodium nitrate for every 100 parts of ammonium nitrate. In particular, the preferred compositions of the present invention comprise an oxygen-releasing salt component consisting of 60 to 90% by weight (of the total composition) ammonium nitrate or mixtures of from 0 to 40% by weight (of the total composition) sodium or calcium nitrates and from 50 to 90% by weight (of the total composition) ammonium nitrate.

Typically, the amount of water employed in the compositions of the present invention is in the range of from 0 to 30% by weight of the total composition. Preferably the amount employed is from 4 to 25%. and more preferably from 6 to 20%, by weight of the total composition.

The water-immiscible organic phase component of the composition of the present invention comprises the continuous "oil" phase of the emulsion explosive and is the fuel. Suitable organic fuels for use in the water-immiscible organic phase include aliphatic, alicyclic and aromatic compounds and mixtures thereof which are in the liquid state at the formulation temperature. Suitable organic fuels may be chosen from fuel oil, diesel oil, distillate, furnace oil, kerosene, naphtha, waxes, (e.g. microcrystalline wax, paraffin wax and slack wax), paraffin oils, benzene, toluene, xylenes, asphaltic materials, polymeric oils such as the low molecular weight polymers of olefins, animal oils, fish oils, and other mineral, hydrocarbon or fatty oils, and mixtures thereof. Preferred organic fuels are liquid hydrocarbons, generally referred to as petroleum distillates, such as gasoline, kerosene, fuel oils and paraffin oils.

Typically, the organic fuel or continuous phase of the emulsion explosive composition of the present invention comprises from 2 to 15% by weight and preferably 3 to 10% by weight of the total composition.

The emulsifying agent component of the composition of the present invention may further comprise additional emulsifiers chosen from the wide range of emulsifying agents known in the art to be useful in the preparation of emulsion explosive compositions. Examples of such emulsifying agents include alcohol alkoxylates, phenol alkoxylates, poly(oxyalkylene) glycols, poly(oxyalkylene) fatty acid esters, amine alkoxylates, fatty acid esters of sorbitol and glycerol, fatty acid salts, sorbitan esters, poly(oxyalkylene) sorbitan esters, fatty amine alkoxylates, poly(oxyalkylene) glycol esters, fatty acid amides, fatty acid amide alkoxylates, fatty amines, quaternary amines, alkyloxazolines, alkenyloxazolines, imidazolines, alkyl-sulfonates, alkylarylsulfonates, alkylsulfosuccinates, alkylphosphates, alkenylphosphates, phosphate esters, lecithin, copolymers of poly(oxyalkylene) glycols and poly(12-hydroxystearic acid), and mixtures thereof. Among the preferred emulsifying agents are the 2-alkyl- and 2-alkenyl-4,4'-bis (hydroxymethyl) oxazoline, the fatty acid esters of sorbitol, lecithin, copolymers of poly(oxyalkylene) glycols and poly(12-hydroxystearic acid), and mixtures thereof, and particularly sorbitan monooleate, sorbitan sesquioleate, 2-oleyl- 4,4'-bis (hydroxymethyl) oxazoline, mixtures of sorbitan sesquioleate, lecithin and a copolymer of poly(oxyalkylene) glycol and poly (12-hydroxystearic acid). and mixtures thereof. Where used, particularly preferred additional emulsifiers include sorbitan esters such as sorbitan monooleate.

Typically, the emulsifying agent component of the composition of the present invention comprises up to 5% by weight of the total composition. Higher proportions of the emulsifying agent may be used and may serve as a supplemental fuel for the composition but in general it is not necessary to add more than 5% by weight of emulsifying agent to achieve the desired effect. One of the advantages of the compositions of the present invention is that stable emulsions can be formed using relatively low levels of emulsifying agent, and for reasons of economy it is preferable to keep to amount of emulsifying agent used to the minimum required to have the desired effect. The preferred level of emulsifying agent used is in the range from 0.1 to 2.0% by weight of the total composition.

If desired, other, optional, fuel materials, hereinafter referred to as secondary fuels, may be incorporated into the compositions of the present invention in addition to the water-immiscible organic fuel phase. Examples of such secondary fuels include finely-divided solids, and water-immiscible organic liquids which can be used to partially replace water as a solvent for the oxygen-releasing salts or to extend the aqueous solvent for the oxygen-releasing salts. Examples of solid secondary fuels include finely divided materials such as: sulfur;

aluminium; and carbonaceous materials such as gilsonite, comminuted coke or charcoal, carbon black, resin acids such as abietic acid, sugars such as glucose or dextrose and other vegetable products such as starch, nut meal, grain meal and wood pulp. Examples of water-miscible organic liquids include alcohols such as methanol, glycols such as ethylene glycol, amides such as formamide and amines such as methylamine.

Typically, the optional secondary fuel component of the compositions of the present invention comprise from 0 to 30% by weight of the total composition.

It lies within the invention that there may also be incorporated into the emulsion explosive compositions hereinbefore described other substances or mixtures of substances which are oxygen-releasing salts or which are themselves suitable as explosive materials. As a typical example of such a modified emulsion explosive composition reference is made to compositions wherein there is added to and mixed with an emulsion explosive composition as hereinbefore described up to 90% w/w of an oxidizing salt such as ammonium nitrate and fuel oil and commonly referred to by those skilled in the art as "ANFO". The compositions of "ANFO" are well known and have been described at length in the literature relating to explosives. It also lies within the invention to have as a further explosive component of the composition well-known explosive materials comprising one or more of, for example, trinitrotoluene, nitroglycerine or pentaerythritol tetranitrate.

Accordingly there is provided an explosive composition comprising as a first component an emulsion explosive composition as hereinbefore described and as a second component an amount of material which is an oxidizing salt or which is in its own right an explosive material.

If desired, the aqueous solution of the compositions of the present invention may comprise optional thickening agents which optionally may be crosslinked. The thickening agents, when used in the compositions of the present invention, are suitably polymeric materials, especially gum materials typified by the galactomannan gums such as locust bean gum or guar gum or derivatives thereof such as hydroxypropyl guar gum. Other useful, but less preferred, gums are the so-called biopolymeric gums such as the heteropolysaccharides prepared by the microbial transformation of carbohydrate material, for example the treatment of glucose with a plant pathogen of the genus Xanthomonas typified by *Xanthomonas campestris*. Other useful thickening agents include synthetic polymeric materials and in particular synthetic polymeric materials which are derived, at least in part, from the monomer acrylamide.

Typically, the optional thickening agent component of the present invention comprises from 0 to 2% by weight of the total composition.

As indicated above, when used in the compositions of the present invention, the thickening agent optionally may be crosslinked. It is convenient for this purpose to use conventional crosslinking agents such as zinc chromate or a dichromate either as a separate entity or as a component of a conventional redox system such as a mixture of potassium dichromate and potassium antimony tartrate.

Typically, the optional crosslinking agent component of the compositions of the present invention comprises from 0 to 0.5% and preferably from 0 to 0.1% by weight of the total composition.

The pH of the emulsion explosive compositions of the present invention is not narrowly critical. However, in general the pH is between 0 to 8 and preferably the pH is between 1 and 6, and may be controlled by suitable addition of conventional additives, for example inorganic or organic acids and salts.

In an embodiment of the present invention, we provide an emulsifier component comprising a condensation product of a primary amine and a poly[alk(en)yl]succinic acid or anhydride and wherein the condensation product comprises at least 70% by weight of the succinimide product.

Preferred primary amines and poly[alk(en)yl]succinic acids and/or anhydrides are as hereinabove defined. Preferred amounts of succinimide product are as hereinabove defined.

The emulsifier component may be prepared by a variety of methods of reacting the primary amine and succinic acid or anhydride component and reaction conditions may be selected to provide the high proportion of sucinimide compound which characterises the compositions of the invention.

The amine and poly[alk(en)yl]succinic anhydride may be heated in a 1:1 molar ratio, optionally in the presence of a solvent or diluent such as an organic fuel. Generally it is convenient to carry our the reaction at relatively high temperatures in order to efficiently prepare a high proportion of succinimide. For example, a condensation product of ethanolamine and polyisobutylene succinic anhydride comprising well over 95% by weight of succinimide product may be prepared by heating the reactants in about a 1:1 mole ratio at a temperature of about 140°-160° C. for 2 hours. Lower temperatures may be used with corresponding increase in reaction times or by actively removing water from the reaction under vaccuum or by using Dean and Stark apparatus and a suitable solvent.

In general, it is preferred that the reaction temperature for preparation of the high succinimide product be at least 100° C. and preferably in the range 100° to 160° C.

At temperatures below 100° C., it is generally necessary to use long reaction times, of the order of several days or more in order to provide a high level of succinimide compound in the product.

The emulsion explosive compositions of the present invention may be prepared by a number of methods. When the composition is a water-in-oil type emulsion explosive, one preferred method of manufacture includes: dissolving said oxygen-releasing salts in water at a temperature above the fudge point of the salt solution, preferably at a temperature in the range from 25° to 100° C., to give an aqueous salt solution; combining said aqueous salt solution, said water-immiscible organic phase, and said emulsifier component, with rapid mixing to form a water-in-oil emulsion; and mixing until the emulsion is uniform.

The invention is now demonstrated by but in no way limited to the following examples in which all parts and percentages are on a weight basis unless otherwise stated.

In the preparation of emulsifiers it is often convenient to provide poly[alk(en)yl]succinic anhydride or acid in an oil diluent. Such mixtures are commercially available. In order to obviate the need to separate the condensation product from the oil diluent, the mixture may be added to the water-immiscible organic phase of the emulsion explosive and the oil diluent considered as part of the water-immiscible organic phase. Thus if the poly[alk(en)yl]succinic anhydride or acid is provided in a paraffin diluent, the paraffin diluent may be considered as part of the water-immiscible organic phase for the purposes of defining the composition of the emulsion explosive.

In the following examples we have found it convenient to use viscosity as an indicator of droplet size in emulsion explosives which have essentially the same formulation. For example to illustrate our invention we prepare emulsion explosives of the same composition except the emulsifiers are of a standard imide/amide ratio or a high imide ratio. By preparing these emulsions under fixed conditions the viscosity provides a convenient indicator of relative droplet sizes.

Emulsions were made with a Hobart N50 planetary mixer.

Emulsifier Preparation 1 (EP1)

Monoethanolamine was added to "MOBILAD"* C207 in a 1:1 molar ratio with respect to polyisobutylene succinic anhydride. (*MOBILAD is a trade mark). MOBILAD C207 is a poly(isobutylene)succinic anhydride having a molecular weight in the range of from 700 to 1200 in a paraffin diluent available from Mobil Oil Co. Ltd. The poly(isobutylene)succinic anhydride content of MOBILAD C207 is 0.76 mmoles/g.

The mixture was stirred at 140° C. for 2 hours at which time infra-red spectroscopy indicated over 95% conversion to the succinimide compound.

Emulsifier Preparation 2 (EP2)

The procedure of EP1 was repeated except the mixture was stirred at 150° C. for 1 hour to achieve almost complete conversion to the imide condensation product.

Emulsifier Preparation 3 (EP3)

The procedure of EP1 was repeated except that the mixture was heated at 120° C. for 4-6 hours under vaccuum. The resulting product comprised over 80% by weight of the imide condensation product.

Emulsifier Preparation 4 (EP4)

Monoethanolamine and "MOBILAD"* C207 were mixed in 1:1 molar ratio with respect to poly(isobutylene)succinic anhydride and the mixture was refluxed with toluene in a Dean and Stark apparatus for 3 hours at 115° C. after which time water removal was complete. Toluene was then removed on a rotary evaporator to give a condensation product comprising over 90% by weight of succinimide product.

Emulsifier Preparation 5 (EP5)

Monoethanolamine and "MOBILAD"* C207 were mixed in 1:1 molar ratio with respect to poly(isobutylene)succinic anhydride and the mixture was refluxed with toluene in a Dean and Stark apparatus for 3 hours at 115° C. after which time water removal was complete. Toluene was then removed on a rotary evaporator.

Comparative Emulsifier Preparation A (CEPA)

Monoethanolamine and MOBILAD C207 were mixed in a 1:1 molar ratio with respect to poly(isobutylene)-succinic anhydride and heated at 60° to 80° C. for 40 minutes. FTIR confirmed a low level of succinimide product (typically between 20 and 30%) and the absence of unreacted anhydride.

Comparative Emulsifier Preparation B (CEPB)

Dimethylaminopropylamine and MOBILAD C207 were mixed in a 1:1 molar ratio with respect to poly(isobutylene)succinic anhydride and allowed to react until essentially no unreacted anhydride remained.

Example 1 (E1)

An emulsion explosive was prepared according to the following procedure.

| Component | Part w/w % |
| --- | --- |
| Chemically pure ammonium nitrate | 42 |
| Calcium nitrate from Norsk Hydro | 37.6 |
| Water | 12.6 |
| Distillate | 6.8 |
| Paraffin oil* | 0.2 |
| Emulsifier** | 0.8 |

*The paraffin oil is the diluent from the emulsifier preparation.
**Emulsifier was prepared according to EP2.

The ammonium nitrate and calcium nitrate were dissolved in water at a temperature of 60° C. and the solution was added to a stirred mixture of distillate and emulsifier. Stirring was continued for a fixed period of time (105 seconds) at a fixed shear rate (stirrer operated at 1000 rpm) after an emulsion of even consistency had formed.

Example 2 (E2)

The procedure of E1 was followed except that the pH of ammonium nitrate/calcium nitrate solution was adjusted to 2.8.

An emulsion of viscosity 2300 cp was formed. After 6 days ambient storage the emulsion was in good condition.

Comparative Example A CEA

The procedure of E2 was followed except the Emulsifier was prepared according to CEPA.

An emulsion of viscosity 1600 cp was formed. The oil phase from the emulsion began to separate and was observed as a separate layer above the emulsion after standing overnight.

Example 3 (E3)

An emulsion explosive was prepared according to the following procedure.

| Component | Part w/w % |
| --- | --- |
| Chemically pure ammonium nitrate | 42 |
| Calcium nitrate from Norsk Hydro | 37.6 |
| Water | 12.6 |
| Distillate | 6.8 |
| Paraffin oil* | 0.2 |
| Emulsifier** | 0.8 |

*The Paraffin oil is the diluent from the emulsifier preparation.
**Emulsifier was prepared according to EP2.

The ammonium nitrate and calcium nitrate were dissolved in water at a temperature of 60° C. and the pH of the solution was adjusted to 3.8 with acetate buffer. The solution was added to a stirred mixture of distillate and emulsifier.

Stirring was continued for 60 seconds at 400 rpm to form a coarse emulsion. The coarse emulsion was further refined for 90 seconds at 1500 rpm.

The viscosity of the coarse emulsion was 640 cp. The viscosity of the refined emulsion was 450 cp.

Example 4 (E4)

An emulsion explosive was prepared according to E3 except that the emulsifier was prepared according to EP3.

The viscosity of the coarse emulsion was 680 cp. The viscosity of the refined emulsion was 4100 cp.

Comparative Example B (CEB)

An emulsion explosive was prepared according to 3 except that the emulsifier was prepared according to CEPA.

The viscosity of the coarse emulsion was 560 cp. The viscosity of the refined emulsin was 3800 cp.

Example 5 (E5)

An emulsion explosive was prepared according to the following procedure.

| Component | Part w/w % |
|---|---|
| NITROPRIL-ammonium nitrate* | 42 |
| Calcium nitrate from Norsk Hydro | 37.6 |
| Water | 12.6 |
| Distillate | 6.8 |
| Paraffin oil** | 0.2 |
| Emulsifier*** | 0.8 |

*'NITROPRIL' is a trade mark of ICI Australia Operations Pty Ltd.
**The Paraffin oil is the diluent from the emulsifier preparation.
***Emulsifier was prepared according to EP2.

The ammonium nitrate and calcium nitrate were dissolved in water at a temperature of 60° C. and the pH of the solution was adjusted to 2.1. The solution was added to a stirred mixture of distillate and emulsifier.

Stirring was continued for 60 seconds at 400 rpm to form a coarse emulsion. The coarse emulsion was further refined for 90 seconds at 1500 rpm.

No phase separation was observed after 2 weeks storage.

Example 6 (E6)

An emulsion explosive was prepared according to E5 except that the emulsifier was prepared according to EP3.

No phase separation was observed after 2 weeks storage.

Comparative Example C (CEC)

An emulsion explosive was prepared according to E5 except that the emulsifier was prepared according to CEPA.

Phase separation, with an oil layer on top of the emulsion was observed within 1 week.

Example 7 (E7)

An emulsion explosive was prepared according to the following procedure.

| Component | Part w/w % |
|---|---|
| NITROPRIL ammonium nitrate* | 42 |
| Calcium nitrate from Norsk Hydro | 37.6 |
| Water | 12.6 |
| Distillate | 6.8 |
| Paraffin oil** | 0.2 |
| Emulsifier*** | 0.8 |

*NITROPRIL is a trade mark of ICI Australia Operation Pty Ltd.
**The Paraffin oil is the diluent from the emulsifier preparation.
***Emulsifier was prepared according to EP2.

The ammonium nitrate and calcium nitrate were dissolved in water at a temperature of 60° C. and the pH of the solution was adjusted to 2.2. The solution was added to a stirred mixture of distillate and emulsifier.

Stirring was continued for 60 seconds at 400 rpm to form a coarse emulsion. The coarse emulsion was further refined for 90 seconds at 1500 rpm.

The viscosity of the refined emulsion was 3300 cp. No phase separation occurred after 19 months ambient storage.

Comparative Example D (CED)

An emulsion explosive was prepared according to E7 except that the emulsifier was prepared according to (CEPB).

The viscosity of the refined emulsion was 1200 cp. An oil layer on top of the emulsion was evident within 12 days.

Example 8 (E8)

An emulsion explosive of the type suitable for use as a packaged explosive was prepared using the following components. The emulsifier used was emulsifier No. 1.

| Component | Part w/w % |
|---|---|
| Chemically pure ammonium nitrate | 64.04 |
| Sodium nitrate | 12.81 |
| Water | 10.88 |
| Wax | 2.35 |
| Paraffin oil | 1.62 |
| Emulsifier* | 1.20 |
| Aluminium | 3.90 |
| C15/250 microballoons** | 3.20 |

*Emulsifier was prepared according to EP3.
**C15/250 microballoons are glass microspheres commercially available from 3M Australia Pty Ltd.

The emulsifier was added to the oil phase at a temperature of 90° C., the oil phase consisting of the wax and paraffin oil components.

A coarse emulsion was prepared by adding the aqueous phase, consisting of a solution of the nitrate salt components in water, to the oil phase at approximately 90° C. The mixer was operated with a whisk at speed 2 for 2 minutes followed by a further 10 minutes at speed 3 to obtain the primary emulsion.

The viscosity of the primary emulsion was 316,000 cp at 77° C. Droplet size of the emulsion was typically in the range 2 to 4 μm. Conductivity of emulsion at 75° C. was $300 + 100$ pSm$^{-1}$.

A portion of the primary emulsion was stored at ambient temperature. The crystal content of the primary emulsion was very low after 27 months.

To a second portion aluminium and microballoons were gently mixed. The mixture was then blended with a leaf paddle for 2.5 minutes at speed 1. The crystal content of the cooled emulsion was also low.

Comparative Example E (CEE)

An emulsion explosive of the type suitable for use as a packaged explosive was prepared according to E8 except the emulsifier was prepared according to CEPA.

The viscosity of the primary emulsion was 260,000 cp at 77° C. Droplet size of the emulsion was typically in the range 3 to 6 μm. Conductivity of emulsion at 75° C. was $300+100$ $pSm^{-1}$.

The crystal content of the primary emulsion was very low after 28 months ambient storage.

Example 9 (E9)

An emulsion explosive of the type suitable for use as a packaged explosive was prepared according to E8 except that the emulsifier was prepared according to EP5.

The primary emulsion had a viscosity of 300,000 cp at 77° C. Droplet size of the emulsion was typically in the range 1 to 3 μm.

Comparative Example F (CEF)

An emulsion explosive of the type suitable for use as a packaged explosive was prepared according to E9 except the emulsifier was prepared according to CEPB.

The viscosity of the primary emulsion was 280,000 cp at 77° C. Droplet size of the emulsion was typically in the range 2 to 4 μm.

Example 10 (E10)

An emulsion of the type suitable for use as a bulk explosive was prepared using the following components in which the emulsifier was prepared.

| Component | Part w/w % |
| --- | --- |
| Chemically pure ammonium nitrate | 73.9 |
| Water | 18.5 |
| Distillate | 6.1 |
| Paraffin oil* | 0.4 |
| Emulsifier | 1.1 |

*The paraffin oil is diluent from the emulsifier preparation.

An aqueous solution was prepared by mixing the ammonium nitrate and water at 70° C. and this solution was added with rapid stirring to a mixture of the emulsifier and distillate at 80° C.

The time required to attain an emulsion viscosity of 24 Pa.s, using a fixed process was monitored. This is taken as an indicator of ease of refinement.

The refinement time was observed to be 9.5 minutes. Emulsion conductivity was found to be 200 $pSm^{-1}$ at 20° C. The crystal content in the emulsion after 3 months was quite low.

Comparative Example G (CEG)

An emulsion explosive of the type suitable for use as a bulk explosive was prepared according to E10 except the emulsifier was prepared according to CEPA.

The refinement time was observed to be 11 minutes. Emulsion conductivity was found to be 500 $pSm^{-1}$ at 20° C. The crystal content in the emulsion after 3 months was low.

Comparative Examples H (CEH)

An emulsion explosive of the type suitable for use as a bulk explosive was prepared using the following components.

| Component | Part w/w % |
| --- | --- |
| Chemically pure ammonium nitrate | 73.9 |
| Water | 18.5 |
| Distillate | 5.8 |
| Sorbitan monooleate | 1.8 |

An aqueous solution was prepared by mixing the ammonium nitrate and water at 70° C. and this solution was added with rapid stirring to a mixture of sorbitan monooleate and distillate at 80° C.

The refinement time was observed to be 9 minutes. Droplet size was observed to be in the range of 3 to 10 μm. The emulsion conductivity was 13900 $pSm^{-1}$.

The emulsion was stored at ambient temperature for 4 months and the level of crystallization was observed to be very extensive.

We claim:

1. An emulsion explosive composition comprising a discontinuous phase comprising an oxygen-releasing salt, a continuous water-immiscible organic phase and from 0.1 to 5% by weight of the composition, of an emulsifier component consisting essentially of a condensation product of a primary amine and a poly[alk(en)y]succinic acid or anhydride and wherein the condensation product comprises at least 70% by weight succinimide product.

2. An emulsion explosive composition according to claim 1 wherein said condensation product comprises at least 85% by weight succinimide product.

3. An emulsion explosive composition according to claim 1 wherein said condensation product comprises at least 90% by weight succinimide product.

4. An emulsion explosive composition according to claim 1 wherein said condensation product comprises substantially all succinimide product.

5. An emulsion explosive composition according to claim 1 wherein said primary amine is selected from the group consisting of aliphatic amines, cycloaliphatic amines, aromatic amines and heteroaromatic amines which primary amines may optionally be substituted with one or more substituents.

6. An emulsion explosive composition according to claim 5 wherein the aliphatic amine is selected from the group consisting of $C_1$ to $C_{20}$ aliphatic amines wherein the aliphatic chain may be straight or branched.

7. An emulsion explosive composition according to claim 6 wherein the aliphatic amine is selected from the group consisting of $C_1$ to $C_{20}$ alkylamine.

8. An emulsion explosive composition according to claim 7 wherein the aliphatic amine is selected from the group consisting of ethylamine, n-butylamine, allylamine, cocoa amine, tallow amine and lauryl amine.

9. An emulsion explosive composition according to claim 5 wherein the aliphatic amine is substituted and selected from the group consisting of hydroxy($C_1$ to $C_{10}$ alkyl)amines, amino ($C_1$ to $C_{10}$ alkyl)amines, ($C_1$ to $C_{10}$ alkyl)amines substituted with the group amino($C_1$ to $C_{10}$ alkyl)amino, ($C_1$ to $C_{10}$ alkyl)amines, phenyl ($C_1$ to $C_{10}$ alkyl)amines and heterocyclic substituted ($C_1$ to $C_{10}$ alkyl) amines.

10. An emulsion explosive composition according to claim 1 wherein the substituted aliphatic amine is selected from the group consisting of ethanolamine, 3-hyroxypropylamine, aminoethylamine, diethylenetriamine, dimethylaminopropylamine and benzylamine.

11. An emulsion explosive composition according to claim 5 wherein the primary amine is a cycloaliphatic amine selected from the group consisting of cyclohexylamine and cyclophentylamine.

12. An emulsion explosive composition according to claim 5 wherein the primary amine is an aromatic amine selected from the group consisting of aniline.

13. An emulsion explosive composition according to claim 5 wherein the primary amine is a heteroaromatic amine selected from the group consisting of aminopyridines.

14. An emulsion explosive composition according to claim 1 wherein the primary amine is selected from the group consisting of ethanolamine and dimethylaminopropylamine.

15. An emulsion explosive composition according to claim 1 wherein the poly[alk(en)yl]succinic acid or anhydride is a saturated or unsaturated hydrocarbon chain which chain is a polymer of a mono-olefin, wherein said chain contains in the range of from 40 to 500 carbon atoms.

16. An emulsion explosive composition according to claim 15 wherein the polymer is derived from the group consisting of $C_2$ to $C_6$ olefins.

17. An emulsion explosive composition according to claim 16 wherein said polymer is derived from the groups consisting of ethylene, propylene, 1-butene, isoprene and isobutene.

18. An emulsion explosive composition according to claim 1 wherein said poly[alk(en)yl]succinic acid and/or anhydride is poly[alk(en)yl]succinic anhydride.

19. An explosive composition according to claim 1 wherein said oxygen-releasing salt is selected from the group consisting of alkali and alkaline earth metal nitrates, chlorates and perchlorates, ammonium nitrate, ammonium chlorate, ammonium perchlorate and mixtures thereof.

20. An explosive composition according to claim 19 wherein said oxygen-releasing salt is selected from the group consisting of ammonium nitrate and a mixture of ammonium nitrate and sodium or calcium nitrates.

21. An explosive composition according to claim 1 wherein said continuous water-immiscile organic phase is selected from the group consisting of aliphatic, alicyclic and aromatic compounds and mixtures thereof which are in the liquid state at the formulation temperature.

22. An explosive composition according to claim 21 wherein said continuous water-immiscible organic phase is selected from the group consisting of fuel oil, diesel oil, distillate, kerosene, naphtha, waxes such as microcrystalline wax, paraffin wax and slack wax, paraffin oils, benzene, toluene, xylenes, polymeric oils such as the low molecular weight polymers of olefins, animal oils, fish oils, and other mineral, hydrocarbon or fatty oils, and mixtures thereof.

23. An explosive composition according to claim 22 wherein said continuous water-immiscible organic phase is selected from the group consisting of gasoline, kerosene, fuel oils, and paraffin oils.

24. A method of preparing emulsion explosives according to claim 1 which method comprises the steps of: dissolving said oxygen-releasing salts in water at a temperature above the fudge point of the salt solution to give an aqueous salt solution; combining said aqueous salt solution, the water-immiscible organic phase and the emulsifier component with rapid mixing to form a water-in-oil emulsion; and mixing until the emulsion is uniform.

* * * * *